(12) United States Patent
Smith

(10) Patent No.: US 10,086,848 B2
(45) Date of Patent: Oct. 2, 2018

(54) STRUCTURE SUITABLE TO FORM PART OF A FLOOR, A SIDEWALL, OR A CEILING OF A GANGWAY

(71) Applicant: Dellner Couplers AB, Falun (SE)

(72) Inventor: Graham Steven Smith, Pontypool (GB)

(73) Assignee: Dellner Couplers AB, Falun (SE)

( * ) Notice: Subject to any disclaimer, the term of this patent is extended or adjusted under 35 U.S.C. 154(b) by 238 days.

(21) Appl. No.: 14/896,115

(22) PCT Filed: Jun. 10, 2014

(86) PCT No.: PCT/EP2014/001570
§ 371 (c)(1),
(2) Date: Dec. 4, 2015

(87) PCT Pub. No.: WO2014/195030
PCT Pub. Date: Dec. 11, 2014

(65) Prior Publication Data
US 2016/0121910 A1 May 5, 2016

(30) Foreign Application Priority Data
Jun. 7, 2013 (EP) .................................... 13275136

(51) Int. Cl.
*B61D 17/22* (2006.01)
*B60D 5/00* (2006.01)
*B61D 17/20* (2006.01)

(52) U.S. Cl.
CPC ............. *B61D 17/22* (2013.01); *B60D 5/003* (2013.01); *B60D 5/006* (2013.01); *B61D 17/20* (2013.01)

(58) Field of Classification Search
CPC ...... B61D 17/00; B61D 17/005; B61D 17/20; B61D 17/22
See application file for complete search history.

(56) References Cited

U.S. PATENT DOCUMENTS 5,515,791 A    5/1996  Britzke et al.
6,076,470 A *  6/2000  Koch ..................... B60D 5/006
                                                 105/14

FOREIGN PATENT DOCUMENTS

| CA | 2148585 A1   | 4/1997  |
| CN | 1056573 C    | 9/2000  |
| CN | 1492818 A    | 4/2004  |
| CN | 102826097 A  | 12/2012 |
| CN | 101934693 B  | 1/2013  |

(Continued)

OTHER PUBLICATIONS

International Search Report and Written Opinion issued for International application No. PCT/EP2014/001570 dated Dec. 15, 2014.

*Primary Examiner* — Robert J McCarry, Jr.
(74) *Attorney, Agent, or Firm* — Howard IP Law Group, PC

(57) ABSTRACT

A gangway for connecting a first car with a second car and for allowing passage of passengers from the first car to the second car. The gangway includes a first hoop having a straight line section for at least a portion of its circumference and a second hoop. A connection element is connected to the first hoop and to the second hoop. The connection element includes an elongated free surface that is movable relative to the straight line section of the first hoop.

12 Claims, 8 Drawing Sheets

(56) References Cited

FOREIGN PATENT DOCUMENTS

| | | |
|---|---|---|
| DE | 29500795 U1 | 3/1995 |
| DE | 202013100563 U1 | 5/2013 |
| EP | 0227310 B1 | 3/1990 |
| EP | 0208436 B2 | 8/1993 |
| EP | 0625459 B1 | 8/1995 |
| EP | 2172383 A1 | 4/2010 |
| EP | 2500230 B1 | 6/2013 |
| FR | 2823265 A1 | 10/2011 |
| WO | 02070320 A1 | 9/2002 |

* cited by examiner

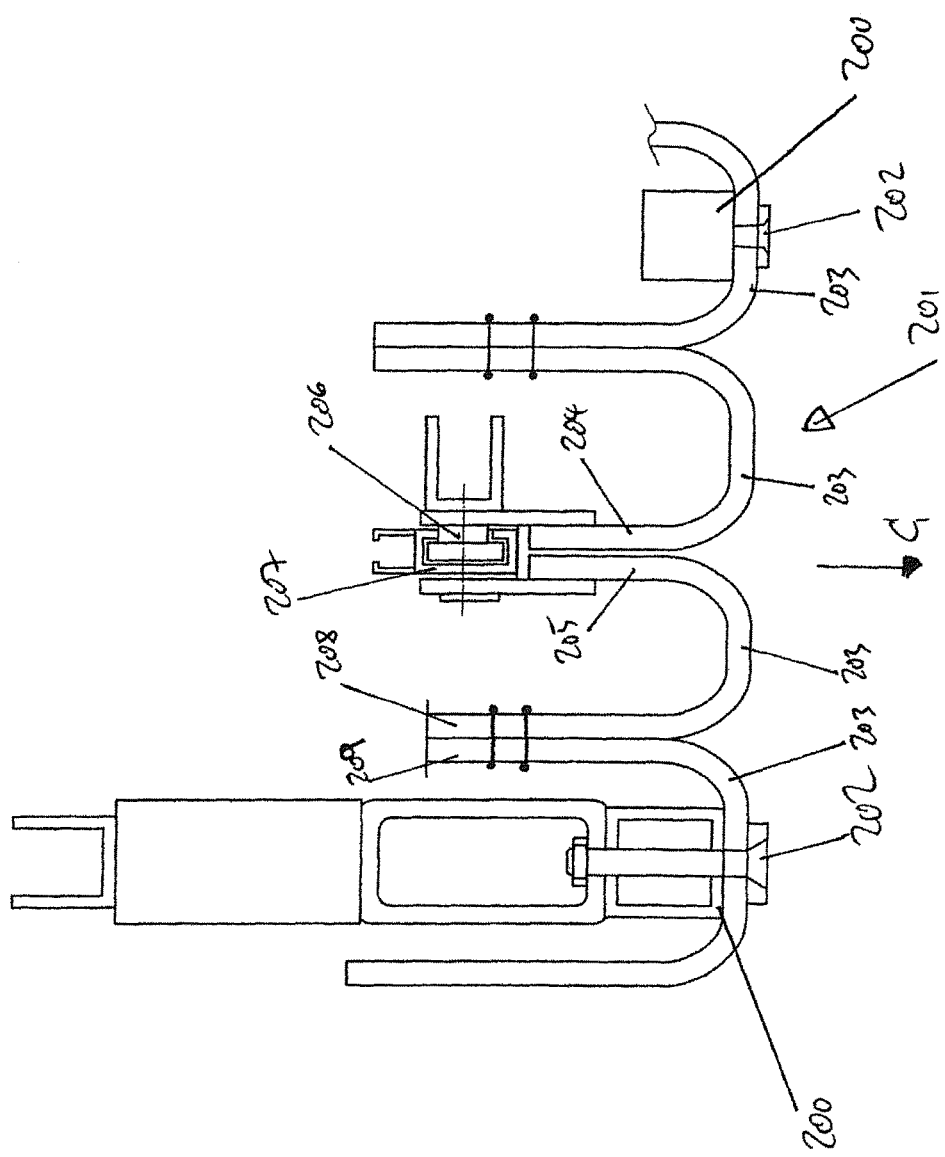

STRUCTURE SUITABLE TO FORM PART OF A FLOOR, A SIDEWALL, OR A CEILING OF A GANGWAY

CROSS REFERENCE TO RELATED APPLICATIONS

This application is a national stage application under 35 U.S.C. § 371 of International Patent Application No. PCT/EP2014/001570 filed Jun. 10, 2014, which claims priority to European Patent Application No. EP 13 275 136.3 filed Jun. 7, 2013, which are incorporated by reference herein in their entireties for all purposes.

FIELD OF THE INVENTION

The invention pertains to a structure that is suitable to form part of a floor, a sidewall or a ceiling of a gangway, which gangway is suitable to connect a first car with a second car and to allow passage of passengers from the first car to the second car. The invention also pertains to a floor of a gangway, which gangway is suitable to connect a first car with a second car and to allow passage of passengers from the first car to the second car. The invention also pertains to a sidewall of a gangway, which gangway is suitable to connect a first car with a second car and to allow passage of passengers from the first car to the second car. The invention also pertains to a ceiling of a gangway, which gangway is suitable to connect a first car with a second car and to allow passage of passengers from the first car to the second car. The invention also pertains to a gangway, which is suitable to connect a first car with a second car and to allow passage of passengers from the first car to the second car.

BACKGROUND OF THE INVENTION

Multi-car vehicles are known in different designs and in different forms of adaptation for uses. Multi-car vehicles, for example, railway-bound trains (street cars and subway-trains also being considered as such trains) are known and are known for the purpose of transporting passengers as well as transporting goods. Further types of multi-car vehicles can be magnetic railway trains or can be buses (road buses as well as buses travelling on fixed tracks). A car of a multi-car vehicle can be a self-supporting cars, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car can not stand by itself, but is vertically supported by at least one neighboring car.

SUMMARY

The present invention inter alia pertains to a gangway that can in a preferred embodiment be used with such types of multi-car vehicles and is suitable to connect a first car with a second car and to allow passage of passengers from the first car to the second car. In the majority of embodiments, the cars of the multi-car vehicle will be connected by a separate connecting device, for example a coupler, that connects the cars in a manner allowing the transmittal of substantial pulling and pushing forces. In the majority of cases, the gangway is designed separately and predominantly designed with the requirements for the passage of passengers from the first car to the second car in mind.

A gangway is typically suitable to shield the passenger from outside influences. One problem to be solved in this context is to ensure that the passenger is shielded from the outside in all operational modes that the gangway will take. A further problem to be solved is to prevent obstacles within the gangway that can harm the passenger. Also, gangways should preferably have a large internal width that allows easy passage of the passengers from the one car to the other car.

At least some of these problems are solved by the embodiments disclosed herein.

The basic idea of the invention is to provide a modular structure that is suitable to form part of a floor, a sidewall or a ceiling of a gangway. The structure being made up of several modules that can be displaced relative to each other gives the structure a certain flexibility to take up different shapes depending on the respective operational mode of the gangway. According to the invention, the modules are elongated panels. The use of panels gives the structure the rigidity necessary to be part of a floor, a sidewall or a ceiling of a gangway. This rigidity is enhanced due to the fact that in the first alternative according to the invention a first elongated panel overlaps a second elongated panel such that the back end of the first elongated panel is in front of the second elongated panel and the front end of the second elongated panel is behind to the back of the first elongated panel and the second elongated panel overlaps an elongated end-panel such that the back end of the second elongated panel is in front of the elongated end-panel and the front end of the elongated end-panel is behind the back of the second elongated panel. In the second alternative according to the invention the first elongated panel overlaps the second elongated panel such that the back end of the first elongated panel is in behind the back of the second elongated panel and the front end of the second elongated panel is in front of the front of the first elongated panel and the second elongated panel overlaps the elongated end-panel such that the back end of the second elongated panel is behind the back of the elongated end-panel and the front end of the elongated end-panel is in front of the front the back of the second elongated panel.

Below, the invention will be described further mainly in relation to the first alternative of the invention, the specific embodiments described below being possible embodiments of the second alternative, too, however.

The advantages of the invention can already be achieved with a first elongated panel, a second elongated panel and an end-panel arranged in the manner as described above. However, the advantages of the invention are achieved to a greater extend, the more elongated panels are used. The more panels are used and the slimmer the panels are chosen to be, the more closely the structure can follow the movements of the gangway. In a preferred embodiment of the first alternative of the invention, a third elongated panel overlaps the first elongated panel such that the back end of the third elongated panel is in front of the first elongated panel and the front end of the first elongated panel is behind the back of the third elongated panel. In a preferred embodiment of the first alternative of the invention, a fourth elongated panel overlaps the third elongated panel such that the back end of the fourth elongated panel is in front of the third elongated panel and the front end of the third elongated panel is behind the back of the fourth elongated panel. In a preferred embodiment of the first alternative of the invention, a fifth elongated panel overlaps the fourth elongated panel such that the back end of the fifth elongated panel is in front of the fourth elongated panel and the front end of the fourth elongated panel is behind the back of the fifth elongated panel. In an even more preferred embodiment the series described above is continued in this manner for the structure to also have a sixth, preferably to also have a seventh, preferably to also have a eighth, preferably to also have a ninth preferably to also have a tenth elongated panel. In an alternatively preferred embodiment, the structure has fifteen panels arranged in a series as described above. In a preferred embodiment, the structure has less than fifteen of panels.

According to the invention, the end-panel is the last panel in the row of elongated panels. The elongated end-panel can, in a preferred embodiment, be arranged such that the back end of the elongated end-panel is in front of the front of a neighboring element. Also the end-panel can be arranged such that the back end of the elongated end-panel is arranged behind the back of a neighboring element. Train designs are known, where a tread plate is attached to the car and rests on the floor of the gangway. In a preferred embodiment, such a tread plate rests on the end-panel. In a different embodiment, the end-panel is connected directly to the neighboring car.

In a preferred embodiment, all panels of the structure, but not the end-panel are identical in shape and built. In an even more preferred embodiment, all panels of the structure including the end-panel are identical in shape and built. This facilitates the manufacture of the structure. Furthermore, making the panels identical facilitates to predict the movements of the panel if the gangway is moved from one operational mode to a different operational mode. Furthermore, making the panels identical allows the structure to take up a symmetric appearance, which pleases the eye of the passenger.

In a preferred embodiment the first elongated panel, the second elongated panel and/or the elongated end-panel has a central section that is substantially rectangular. Gangways are often designed such that in a first operational mode (in most cases the operational mode that the gangway takes up when the respective vehicle is travelling in a straight line (the cars of the vehicle being arranged in a straight line)) the floor, the ceiling and the sidewalls are approximately of rectangular shape. Choosing the panels to have a central section that is substantially rectangular facilitates to design the structure in such a way that the floor, the sidewall or the ceiling that the structure is part of takes up an approximately rectangular shape in a first operational mode of the gangway. In a preferred embodiment, the substantially rectangular central section has a first elongated side that forms part of the front end of the respective panel and has a second elongated side, parallel to the first side that forms part of the back end of the respective panel.

In a preferred embodiment the first elongated panel, the second elongated panel and/or the elongated end panel has a side end section that extends along the respective longitudinal axis of the respective panel, whereby the width of the side end section in direction perpendicular to the respective longitudinal axis diminishes in the direction along the respective longitudinal axis. Having the width of the side end section diminish in direction perpendicular to the respective longitudinal axis makes the respective panel smaller towards its end. This allows this end of the panel and the neighboring ends of the neighboring panels to be moved closer to each other without the side ends of the respective panels abutting against each other or disturbing the respective movement of the panel. In an embodiment, where the structure build according to this embodiment is used to form part of a floor or to form part of a ceiling of a gangway, such a design is helpful for operational modes where the respective vehicle is going around a bend and the side end sections designed in the manner described above are arranged at the inside of the curve. In such an embodiment, the panels will fan out and the tapered design of the respective side end sections facilitates this movement. In an embodiment, where the structure build according to this embodiment is used to form part of a sidewall, such a design is helpful for operational modes where the respective vehicle is going over a hill-top or trough a through. In such an embodiment, the panels will fan out and the tapered design of the respective side end sections facilitates this movement.

In a preferred embodiment, the width of the side end section in direction perpendicular to the respective longitudinal axis diminishes equally in the direction along the respective longitudinal axis. In a preferred embodiment, the side end section has a front end that is in line with the front end as it is defined by the first elongated side of a central section that forms part of the panel. The width of the side end section in this embodiment thus diminishes by way of moving the back end closer towards the front end.

In a preferred embodiment, the width of the end section in the direction perpendicular to the respective longitudinal axis diminishes in two or more different ways along the respective longitudinal axis. In a preferred embodiment the back end of the side end section is arranged at a steeper angle relative to the longitudinal axis for a part of the side end section that is closer to the central section. For a part of the side end section that is further away from the central section, the back end of the side end section is embodiment is arranged at an angle shallower than the steeper angle relative to the longitudinal axis.

In a preferred embodiment, the first elongated panel can move along its longitudinal axis relative to the second elongated panel and/or the second elongated panel can move along its longitudinal axis relative to the elongated end-panel. This embodiment allows lateral shear between the panels, for example for operational modes where the first car and the second car that are connected to each other are not arranged in a straight line, but with their longitudinal axis being offset in parallel to one another (offset horizontally, if the structure is used a part of a floor or a ceiling of a gangway, offset vertically, if the structure is used as part of a side all of a gangway).

In a preferred embodiment, the first elongated panel and the second elongated panel in a first operational mode are arranged such that the first longitudinal axis is parallel to the second longitudinal axis, whereby the first elongated panel can swivel relative to the second elongated panel such that in a different operational mode the first longitudinal axis is at an angle to the second longitudinal axis, the angle being different from 0° and 180°. Such a design is advantageous for operational modes, in which the structure forms part of a floor or a ceiling of a gangway and the multi-car vehicle drives around a bend. Such a jaw-movement, where the panels fan out allows the side end sections of the panels to move closer to each other on the inner side of the bend and of side end sections of the panels to move apart from each other on the outer side of the bend. For embodiments where the structure is used to form part of a sidewall of a gangway, such jaw-movements can take place, if the vehicle is moving over a hill-top or moving through a trough.

In a preferred embodiment an element is attached to the first elongated panel, whereby a part of this element reaches behind the back of the second elongated panel and/or in that an element is attached to the second elongated panel and that a part of this element reaches behind the back of the elongated end-panel. Providing for such elements that reach behind the back of the neighboring panel allows to limit the movement of the respective panel in the direction that its back is facing. In a preferred embodiment, for example when the structure is used to form part of a floor or a ceiling of the gangway, the element can be attached to the back of the first elongated panel and reaches behind the back of the second elongated panel. In a preferred embodiment, this element that reaches behind the back of the neighboring panel can be arranged at an angle relative to the longitudinal axis of the respective panels. Such an arrangement allows such an element also to be used as a limiting device that limits the relative movements of the neighboring elongated panels relative to each other in the direction of their respective longitudinal axis (sheer movements). In a preferred embodiment, the second elongated panel has an abutment element and the element that is attached to the first elongated panel and reaches behind the back of the second elongated panel abuts against this abutment element attached to the back of the second elongated panel when the two panels reach a predetermined position relative to each other during the sheer movement. For sheer movements in the opposite direction, further abutment elements can be provided or the elements that reach behind the respective back of the respective neighboring panel are designed such that the elements of two neighboring plates against each other and thereby stop a further relative movement in the direction of the longitudinal axis.

In a preferred embodiment the element attached to the first elongated panel that reaches behind the back of the second elongated panel extends parallel to the longitudinal axis of the respective panel. This embodiment is preferably used if the structure is used to form part of the sidewall of a gangway. In such an arrangement; the side panels can be build into the structure such that they extend vertically and rest on one side end section (the bottom side end section). At this bottom side end section, but also at the opposite side at the top side at the top side end section, an element can be arranged that extends parallel to the longitudinal axis, preferably parallel to the front end of the respective panel and the neighboring panel is slit between the first elongated panel and its element such that the element reaches behind the back of the second elongated panel.

In a preferred embodiment, the elements that reach behind the back of the respective neighboring elongated panel can be of hook shape. Making use of a hook shape not only allows to limit the movement of the neighboring panel in one direction (for example in the direction that the back of the respective panel is facing), but also allows to limit the relative movement of the panels also in a further direction.

In a preferred embodiment at least some of the panels are made from metal or are made from plastic or are made from wood or are made from composite materials, for example combinations of wood and plastic or combinations of wood and metal or combinations of metal and plastic materials. To facilitate the movement of the panels relative to each other, especially for those parts that move relative to each other, especially for those parts that in a preferred embodiment rest on a part of the neighboring panel, the respective panel can be provided with a coating that reduces the friction between the panels or can be provided with wear pads. The elongated panels may be partially covered by a surface material for nonslip safety purpose or for aesthetic purpose. Preferably any surface coating would not be attached to parts of the elongated that are swept across by adjacent panels during the normal operational modes.

In a preferred embodiment at least some of the panels, preferably all of the panels can flex about their longitudinal axis and/or can flex about an axis perpendicular to the longitudinal axis and/or can flex in such a manner that diagonally opposite arranged corners of the panels can be moved closer to each other. This flexibility of the panels allows the structure to take up movements, for example movements where the cars of a multi-car vehicle connected together by a gangway that has the structure according to the invention as part of it tilt relative to each other or twist relative to each other.

In a preferred embodiment, the panels primarily extend along their longitudinal axis and extend a certain amount along an axis perpendicular to the longitudinal axis, but only extend a small amount in the direction perpendicular to these two axis (height direction). The extend in the height direction of the panels is primarily influenced by elements that possibly are attached to the panel and suitable to reach behind the back of a neighboring panel or are influenced by abutment elements attached to the back of the respective panel. In a preferred embodiment, the panel has a sheet-type basic body with other, additional elements being attached to this basic body. This sheet-type basic body is preferably designed to be flat. However, to facilitate the back end of such a basic body to reach behind the back of a neighboring panel, the part of the basic body that neighbors the front end can be bent outwards (backwards). In a preferred embodiment, the panels are at least 1.5 m, preferably at least 2 m, preferably at least 2.5 m, preferably at least 3 m, preferably at least 3.5 m and preferably at least 4 m long in the direction along their longitudinal axis, at least 0.1 m, preferably at least 0.15 m, preferably at least 0.2 m, preferably at least 0.25 m, preferably at least 0.3 m, preferably at least 0.35 m, preferably at least 0.4 m, preferably at least 0.45 m long in the direction perpendicular to the longitudinal axis and preferably less than 0.5 m long in the direction perpendicular to the longitudinal axis, than and preferably at least 2 mm, preferably at least 3 mm, preferably at least 5 mm, preferably at least 10 mm, preferably at least 12 mm, preferably at least 15 mm, preferably at least 20 mm, preferably at least 25 mm, preferably at least 30 mm long in the direction perpendicular to these two axis (the height direction). In an alternative embodiment, the elongated panel is preferably less than 10 mm, preferably less than 5 mm long in the direction perpendicular to these two axis (the height direction).

In a preferred embodiment, the basic body is made from one single material. In an alternative embodiment, the basic body is made up of several materials. The basic body can have insets of a different material, for example of a material suitable as wear pads, while the remainder of the basic body is made up of a different material. The inserts are used to reduce the built-height of the elongated panel and to great a plane front surface. This allows the step-height to be reduced, the step-height being the step that is created by the neighboring panel overlapping the front of the panel and that creating a step. In an even more preferred embodiment, the surface area of the front of an elongated panel that will be swept by the front end of the neighboring elongated panel being placed in front of the front of panel is lowered relative to the remainder of the front of this panel. This will reduce the step-height even more.

In a preferred embodiment, at least 30%, preferably at least 40%, preferably at least 50%, preferably at least 60%, preferably at least 70% of the surface area of the basic body overlaps the neighboring panel in an operational mode where the longitudinal axis of the panels are arranged parallel to each other and the center of mass of each basic body is aligned in a straight line with the center of mass of the neighboring panels, the straight line preferably being perpendicular to the respective longitudinal axis of the respective panels.

In a preferred embodiment, the front end is provided by a front edge of the basic body. In a further preferred embodiment, the back end of the respective panel is provided by a back edge of the basic body.

The floor of a gangway according to the invention has a part of the floor being formed by the structure according to the invention. In a preferred embodiment, the floor has a surface area that is suitable to be the surface area of the floor of a gangway floor that is visible to the passenger, whereby in the preferred embodiment at least the mayor part of this surface area, preferably at least 51%, preferably at least 75% is provided by surfaces of the structure, preferably all of this surface area being provided by surfaces of the structure.

In a preferred embodiment, in a first operational mode the first longitudinal axis, the second longitudinal axis and the third longitudinal axis extend essentially horizontally.

In a preferred embodiment, the front end of the first elongated is supported by a first beam, the front end of the second elongated is supported by a second beam and/or the front end of the longitudinal end-panel is supported by an end beam. The support on the panels on the beams can be achieved by direct contact of a basic body of the panel with the beam, for example with the front edge of the basic body resting on the beam. Alternatively, abutment elements can be arranged between the front end of the basic body and the beam such that the basic body rests on the beam via the abutment elements. In a preferred embodiment, these abutment elements can have a elasticity that is higher than the elasticity of the beam or the basic body of the panel and thus allow for relative movements between the beams and the basic bodies of the panel.

In a preferred embodiment, the beams are arranged to be movable relative to each other. Preferably, the beams extend along or parallel to the longitudinal axis of the panel and are arranged in such a manner that they can move relative to each other in direction of their respective longitudinal axis. In a preferred embodiment, the beams are movable relative to each other in such a manner that they can move from a first operational mode, where the longitudinal axis of the beams are arranged parallel to each other to a second operational mode, where the beams are arranged at an angle to one another.

In a preferred embodiment, the front end of the second elongated is supported by a second beam and the front end of the longitudinal end-panel is supported by an end-beam, whereby first elastic elements are arranged between the first beam and the second beam and second elastic elements are arranged between the second and the third beam and whereby the first elastic elements and the second elastic elements pretension the first beam, the second beam and the third beam into a position in that the distance between the first beam and the second beam is the same as the distance between the second beam and the third beam.

Providing the elastic elements allows to pretension the beams such that the panels take up a predetermined position, if no additional forces act on the beams.

In a preferred embodiment, the elastic elements are made of bend elastic bands that are arranged between the beams in a horse shoe-shape, the elongated linear parts of the horse shoe being attached to the respective beam. In a preferred embodiment, several such elastic elements are arranged between two beams. This allows for a higher restoring force to be applied to the beams.

In a preferred embodiment the front end of the first elongated is supported by a first beam, the front end of the second elongated is supported by a second beam and the front end of the longitudinal end-panel is supported by a end-beam, whereby the first beam, the second beam and the third beam each have a hole and that a further beam passes through the respective hole in each respective beam.

This arrangement ensures that the beams take predefined positions relative to each other. For example during a sheer movement, the beam arranged through the holes in the first, second and third beam follows a similar sheer movement and prevents that the complete sheer is taken up by the first beam moving relative to the second beam, for example. In a preferred embodiment several beams, preferably three are arranged to pass through respective holes in the respective first, second and third beam. Preferably, one of these beams is arranged approximately in the middle of the panels, while further two beams are arranged towards the side end sections of the respective beams. In a preferred embodiment, the beams can have guiding rails with guiding elements being attached to the respective panel and resting in the guiding rail. The beams also can have a friction reduced surface on their surface that comes into contact with the first, second and third beam and therefore facilitates the movement of the first, second and third beam relative to the further beam.

In a preferred embodiment, the front end of the first elongated is supported by a first beam, the front end of the second elongated is supported by a second beam, whereby an element is arranged protruding a first distance from the first beam such as to prevent the second beam to come closer to the first beam as the first distance when the second beam moves relative to the first beam as the second beam comes into contact with the element.

Such an element prevents the beams to come closer to each other than a predetermined amount (the amount that the element protrudes from the first beam). Providing such an element assists the symmetric arrangement of the panels in the operational modes where certain sections of the respective beams moved closer to one another. In a preferred embodiment, the element is protruding from the first beam has a tapered shape, which facilitates the beams to take up a position, where the longitudinal axis of the respective beams are arranged at an angle to one another In a preferred embodiment, the element that is arranged protruding from the first beam has an elastic coating to dampen the contact of the respective beam with the protruding element, when the beam abuts against the protruding element.

In a preferred embodiment, the first elongated is arranged in such a manner that it can swivel about an axis that is parallel or coaxially to the first longitudinal axis and/or the second elongated is arranged in such a manner that it can swivel about an axis that is parallel or coaxially to the second longitudinal axis.

The sidewall of a gangway according to the invention has a part of the sidewall being formed by the structure according to the invention. In a preferred embodiment, the sidewall has a surface area that is suitable to be the surface area of sidewall of a gangway floor that is visible to the passenger, whereby in the preferred embodiment at least the mayor part of this surface area, preferably at least 51%, preferably at least 75% is provided by surfaces of the structure, preferably all of this surface area being provided by surfaces of the structure.

In a preferred embodiment in that in a first operational mode the first longitudinal axis, the second longitudinal axis and the third longitudinal axis extend essentially vertically.

In a preferred embodiment elastic elements are provided that pretension the back end of the respective one elongated panel against the front of a respective neighboring elongated panel and/or the front end of the respective neighboring elongated panel against the back of the respective one elongated panel.

In a preferred embodiment the first elongated has a first side end that forms the one end of the first elongated in the direction of the first longitudinal axis and that the first side end is supported by a support element and/or in that the second elongated has a first side end that forms the one end of the second elongated in the direction of the second longitudinal axis and that the first side end is supported by a support element. In a preferred embodiment, the first elongated and the second elongated are support by different support elements. In a preferred embodiment, a second side end that forms the end opposite the first side end of the first elongated in the direction of the first longitudinal axis is held by a holding element and/or a second side end that forms the end opposite the first side end of the second elongated in the direction of the second longitudinal axis is held by a holding element. In a preferred embodiment, the respective second side end of the first elongated and the second elongated are held by different holding elements.

In a preferred embodiment first elongated is arranged in such a manner that it can swivel about an axis that is parallel or coaxially to the first longitudinal axis and/or the second elongated is arranged in such a manner that it can swivel about an axis that is parallel or coaxially to the second longitudinal axis. In a preferred embodiment where support elements are provided, the first side end of the respective panel pivots on the support element. In a preferred embodiment where holding elements are provided, the first side end of the respective panel pivots relative to the holding element.

The ceiling of a gangway according to the invention has a part of the ceiling being formed by the structure according to the invention. In a preferred embodiment, the ceiling has a surface area that is suitable to be the surface area of the ceiling of a gangway floor that is visible to the passenger, whereby in the preferred embodiment at least the mayor part of this surface area, preferably at least 51%, preferably at least 75% is provided by surfaces of the structure, preferably all of this surface area being provided by surfaces of the structure.

The gangway according to the invention is suitable for connecting a first car with a second car and allowing passage of passengers from the first car to the second car and has a floor according to the invention, a sidewall according to any the invention and/or a ceiling according to the invention.

In a preferred embodiment, only the floor or a ceiling or one sidewall or both sidewalls of the gangway are designed according to the invention. This allows the advantages of the invention to be realized at a part of the gangway, where they are most wanted, but allows other parts of the gangway to be designed in a simplified manner. In an alternative embodiment, the floor and both sidewalls are designed according to the invention, whereby the panels used for the floor are preferably of different design than the panels used for the sidewalls. In a further preferred embodiment; the floor, both sidewalls and the ceiling are designed according to the invention, whereby the panels used for the floor are preferably of different design than the panels used for the sidewalls and the panels used for the floor and the panels used for the sidewalls are again different to the panels used for the ceiling.

In a preferred embodiment a structure according to the invention used to form part of the gangway is placed in such a way that the fronts of the elongated panels are facing inwards, the inside of the gangway being the free volume through which the passenger is intended to move from one car to the next car. In a preferred embodiment, the inward facing fronts of the panels are only partially covered, because of being overlapped by a neighboring panel, but are otherwise uncovered and thus visible to the passenger.

In a preferred embodiment the gangway has a bellows. In a preferred embodiment; the bellows defines at least a part of the envelope of the gangway, for example defines the outward facing part of the sidewalls and the ceiling of the gangway, while being open below the parts of the floor of the gangway that are intended for the passenger to tread on, or for example defines the outward facing part of the sidewalls, the floor and the ceiling of the gangway, thus fully encompassing the gangway while only being open at the front of the gangway that faces the one car and the back of the gangway that faces the other car. In a preferred embodiment, a structure according to the invention used to form part of the gangway is placed inside the bellows. In a preferred embodiment, the bellows is of polymer material and is fastened to support hoops made from vacuum molded panels. In a preferred embodiment, the bottom panel of the bellows can be removed for maintenance access. In a preferred embodiment, the bellows is a polymer laminate with exterior fabric layer that has printed pattern on it for aesthetic appearance.

In a preferred embodiment, the gangway has a series of hoops. In a preferred embodiment the hoops have an essentially rectangular, preferably quadratic shape, the corners in a preferred embodiment being rounded or chamfered or beveled. Preferably, a respective hoop is made up of joint together beams.

In a preferred embodiment the hoop envelopes an area that is large enough for a passenger to pass through. Preferably at least at somewhere along the circumference of the hoop, the distance between to opposite points on the hoop, preferably the distance between two parallel beams that form part of the hoop if the hoop is of rectangular shape, is larger than 1.5 m, preferably larger than 1.75 m, preferably larger than 2 m, preferably larger than 2.5 m, preferably larger than 3 m. Especially such a design of the hoops allows the hoops to envelope an area that is large enough for a passenger to pass through.

In a preferred embodiment, the hoops of the gangway are arranged such that in one operational mode of the gangway, the respective center of mass of the hoops lie on a straight line, preferably a straight line that is perpendicular to the respective plane in which a respective hoop lies in. This operational mode is preferably the operational mode that the gangway takes up, when built in between two cars that travel along a straight line on level ground.

In a preferred embodiment, the bellows is attached to the hoops. This allows the hoops to support the bellows. In an alternative embodiment, a separate support structure for the bellows can be provided.

In a preferred embodiment the number of elongated panels in a structure according to the invention that forms part of the gangway according to the invention is equal to the number of hoops of the gangway. In a preferred embodiment of this embodiment, each elongated panel of a structure according to the invention that forms part of the gangway according to the invention is supported or connected in a supporting manner to a beam that makes up part of a hoop. In an embodiment, where a structure according to the invention forms part of a floor of a gangway, each elongated panel of this structure is supported, preferably by its front end, by a beam that makes up part of a hoop. In an especially preferred embodiment of such an embodiment, the elongated panels are not only supported, preferably by their front ends, by a beam, preferably a substantially horizontally orientated beam that makes up part of a hoop, but are also connected in a pivotable manner to further, preferably substantially vertically orientated beams that make up part of the hoop by their side end sections. Such an arrangement allows the respective panel to be built into the hoop in a defined manner. Such an arrangement allows the panel to transmit vertical forces, for example the weight of the passenger, to the hoop, for example by the panel being supported by the substantially horizontally orientated beam. At the same time the connection to the substantially vertically orientated beams can limit or preferably prevent relative movements of the elongated panel relative to the hoop along the longitudinal axis of the panel. The connection to the substantially vertically orientated beams allows the hoop to take the panel with it, if the hoop is moved relative to a neighboring hoop. In an embodiment, where a structure according to the invention forms part of a sidewall of a gangway, each elongated panel of this structure is supported, preferably at a first side end of the panel, by a support element that is connected to a substantially vertically orientated beam that makes up part of a hoop. In an especially preferred embodiment of such an embodiment, the elongated panels are not only supported at a first side end by a support element that is connected to a substantially vertically orientated beam, but also held by a holding element at a second side end, arranged opposite said first side end, whereby the holding element that is connected to a substantially vertically orientated beam that makes up part of a hoop, preferably the same vertically orientated beam that the support element is connected to. The connection to the substantially vertically orientated beams via the support element and the holding element allows the hoop to take the panel with it, if the hoop is moved relative to a neighboring hoop.

The description of the invention makes reference to operational modes. This accounts for the fact that the structure according to the invention, the floor according to the invention, the sidewall according to the invention, the ceiling according to the invention and the gangway according to the invention have parts that can take up different positions relative to other parts of the structure, the floor, the sidewall, the ceiling, the gangway respectively. In a preferred embodiment the structure according to the invention, the floor according to the invention, the sidewall according to the invention, the ceiling according to the invention and the gangway according to the invention have a first operational mode, which is the operational mode in that the center of mass of the elongated panels of a respective structure of the invention all lie on one straight line, preferably a straight line that is perpendicular to the longitudinal axis of the elongated panels. In an embodiment where a first structure according to the invention is used to form part of the floor of a gangway, a second structure according to the invention is used to form part of a first sidewall of a gangway and a third structure according to the invention is used to form part of a second sidewall of a gangway opposite to the first sidewall, in the first operational mode the center of mass of the elongated panels that form part of the first structure all lie on a first straight line, preferably a straight line that is perpendicular to the longitudinal axis of the elongated panels, the center of mass of the elongated panels that form part of the second structure all lie on a second straight line, preferably a straight line that is perpendicular to the longitudinal axis of the elongated panels, and the center of mass of the elongated panels that form part of the third structure all lie on a third straight line, preferably a straight line that is perpendicular to the longitudinal axis of the elongated panels.

Preferably, the first operational mode of the gangway is the mode that the gangway is in when it is built in between a first car and a second car and the first and the second car are travelling along a straight line on a level surface. In a preferred embodiment of the gangway, wherein a structure according to the invention is used to form part of the floor of a gangway and wherein the center of mass of the elongated panels of the respective structure all lie on one straight line in the first operational mode, the straight line is parallel to and preferably in the same vertical plane than the longitudinal axis of the first and the second car and preferably a straight line that is perpendicular to the longitudinal axis of the elongated panels.

In a preferred embodiment the gangway can take up an operational mode in which the floor approximately takes up the shape of a small segment of a ring or a donut, one sidewall being outwardly bend to be approximately the shape of an segmented round arch and the opposite sidewall being inwardly bend to be approximately the shape of an segmented round arch, for example if the gangway is built between two cars that go around a bend. In a preferred embodiment of such an embodiment a structure according to the invention makes up part of the floor of the gangway with the longitudinal axis of the respective elongated panels not being in parallel, but fanning out. In a preferred embodiment of such an embodiment structures according to the invention makes up part of the sidewalls of the gangway respectively with the respective elongated panels not being arranged approximately in one vertical plane, but being moved relative to each other so that they generally follow the segmented round arch.

In a preferred embodiment the gangway can take up an operational mode in which the floor approximately takes up the shape of a rectangle, preferably a square, and the sidewalls take up the shape of a non-rectangular parallelogram, for example if the gangway is built between two car that go in a straight line, with the longitudinal axis of the two cars being coaxial, but with the end of the first car being lower than the neighboring end of the second car. In a preferred embodiment of such an embodiment a structure according to the invention makes up part of the floor of the gangway with the respective center of mass of the respective elongated panels being on a straight line that is perpendicular the respective longitudinal axis of the elongated panels. In a preferred embodiment of such an embodiment structures according to the invention makes up part of the sidewalls of the gangway respectively with the respective elongated panels being arranged with their respective longitudinal axis being in parallel to each other, but with the respective panels having moved relative to each other in direction of their respective longitudinal axis such that the respective center of mass of the respective elongated panels are on a straight line, but said straight line is not perpendicular the respective longitudinal axis of the elongated panels.

In a preferred embodiment the gangway can take up an operational mode in which the sidewalls approximately takes up the shape of a rectangle, preferably a square, and the floor takes up a the shape of a non-rectangular parallelogram, for example if the gangway is built between two car that go in a straight line, with the longitudinal axis of the two cars being parallel and in the same horizontal plane, but not coaxial. In a preferred embodiment of such an embodiment a structure according to the invention makes up part of the respective sidewall of the gangway with the respective center of mass of the respective elongated panels being on a straight line that is perpendicular the respective longitudinal axis of the elongated panels. In a preferred embodiment of such an embodiment structures according to the invention makes up part of the floor of the gangway respectively with the respective elongated panels being arranged with their respective longitudinal axis being in parallel to each other, but with the respective panels having moved relative to each other in direction of their respective longitudinal axis such that the respective center of mass of the respective elongated panels are on a straight line, but said straight line is not perpendicular the respective longitudinal axis of the elongated panels.

According to a further alternative or additional aspect of the invention a gangway for connecting a first car with a second car and allowing passage of passengers from the first car to the second car has at a first and a second hoop, the first hoop for at least a portion of its circumference having a straight line section, whereby a connection element is connected to the first hoop and to the second hoop, whereby the connection element has an elongated free surface and whereby the elongated free surfaces of the connection element is movable relative to the straight line section of the first hoop. Such a design allows the hoops of a gangway to be connected to one another, but at the same time allows for more sheer movement of the hoops relative to each other than would be possible, if the hoops were connected to each other with a flexible material that is fixedly connected to both hoops and would need to take up the sheer by means of its flexibility only In a preferred embodiment, the elongated free surface is movable in a linear motion relative to the straight line section.

In a preferred embodiment, the elongated free surface is facing the straight line section.

In a preferred embodiment the gangway has a plurality of hoops and in that each hoop has a straight line section and in that between each of two neighboring hoops a connection element is provided, connected to the first of the two neighboring hoops and the second of the two neighboring hoops and in that each connection element has an elongated free surface that faces a straight line section of one of the two neighboring hoops and whereby the elongated free surfaces of the connection element is movable relative to the straight line section.

According to a further alternative or additional aspect of the invention a gangway has at a first and a second hoop, the first hoop for at least a portion of its circumference having a straight line section, whereby a connection element is connected to the first hoop and to the second hoop, the connection element being connected to the first hoop by means of protruding elements arranged as part of the connection element being taken up by rails arranged as part of the first hoop and being slideable along the rails or by means of protruding elements arranged as part of the first hoop being taken up by rails arranged as part of the connection element and being slideable along the rails.

According to a further alternative or additional aspect of the invention a gangway has bellows made up of a series of convolutes, at least the majority of convolute approximately having the cross-sectional shape of a horse-shoe and a first convolute being connected to a second neighboring convolute by means of attaching the one elongated section of the first horse-shoe shaped convolute to one elongated section of the second horse-show shaped convolute, whereby the connection allows the one elongated section of the first horse-shoe shaped convolute to slide relative to the one elongated section of the second horse-show shaped convolute. Preferably the connection is formed by protruding elements that are connected to the one elongated section of the first horse-shoe shaped convolute and a channel connected to one elongated section of the second horse-show shaped convolute, whereby the protruding elements are held inside the channel in such a manner that the protruding elements can slide along the channel, thereby allowing the one elongated section of the first horse-shoe shaped convolute to slide relative to the one elongated section of the second horse-show shaped convolute.

The bellows can be used to make up the inward facing ceiling of a gangway, but can also be used as the bellows that envelope the gangway on the outside. Also, the bellows can be used below the floor of a gangway.

In a preferred embodiment, the convolutes are made of rubber or a composite material that comprises rubber.

In a preferred embodiment the other elongated section of the second horse-show shaped rubber convolute is fixedly connected to one elongated section of a third horse-show shaped rubber convolute. Preferably, the second horse-show shaped rubber convolute is sewn to one elongated section of a third horse-show shaped rubber convolute.

In a preferred embodiment the gangway according to the invention is built between a first car and a second car of a multi-car vehicle, the multi-car vehicles being railway-bound trains (street cars and subway-trains also being considered as such trains) or a magnetic railway trains or a bus (road buses as well as buses travelling on fixed tracks). A car of a multi-car vehicle can be a self-supporting cars, whereby the car has sufficient wheels that are placed at sufficient locations such that the car can stand by itself without being supported by other cars, for example a three-wheeled car, a four wheeled car or a car with even more wheels placed suitable locations. A car of a multi-car vehicle can also be of the non-self-supporting type, whereby the car has no wheels or only wheels provided in such number or arranged at such a place that the car can not stand by itself, but is vertically supported by at least one neighboring car.

BRIEF DESCRIPTION OF THE DRAWINGS

Below the invention will be described with reference to Figures that only show exemplary embodiments of the invention. In those Figures FIG. 10 shows a further alternative or additional aspect of a gangway according to the invention in a sectional view that shows a section of the bellows of a gangway.

DETAILED DESCRIPTION

Figure 1:
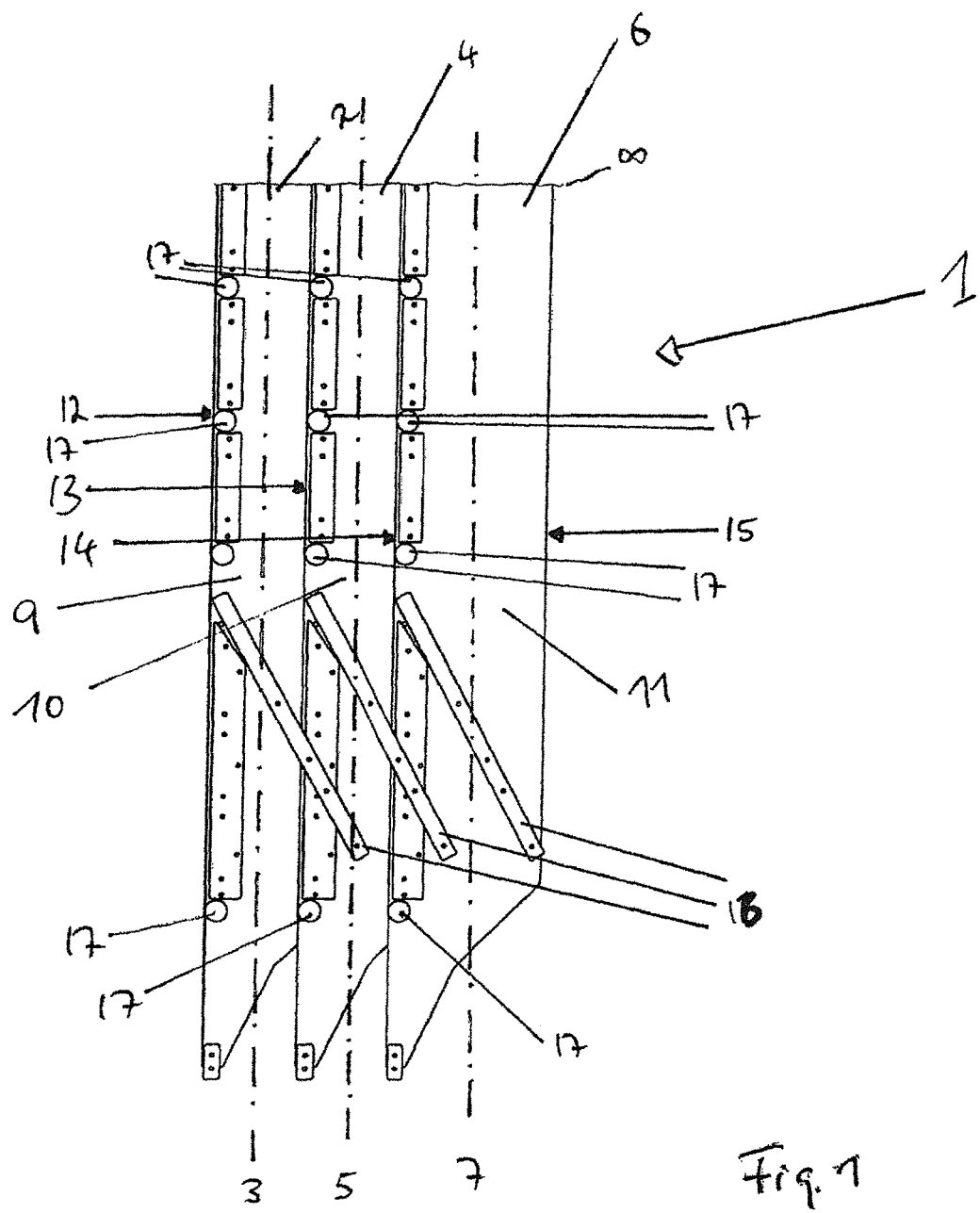
FIG. 1 shows a view from below onto a portion of a structure according to the invention with the structure being in a first operational model.

FIG. 1 shows a part of structure 1 that is suitable to form part of a floor of a gangway, which gangway is suitable to connect a first car with a second car and to allow passage of passengers from the first car to the second car. The structure 1 comprises a first elongated panel 2 that extends along a first longitudinal axis 3 and a second elongated panel 4 that extends along a second longitudinal axis 5 and an elongated end-panel 6 that extends along a third longitudinal axis 7. In the first operational mode shown in FIG. 1, the longitudinal axis 3, 5, 7 are in parallel.

FIG. 1 shows one half of the structure according to invention. The second half that extends behind the cut-line 8 shown in FIG. 1 is the mirror-image of the half shown in FIG. 1, the second half being in line-symmetry about the cut-line 8 to the visible half.

The first elongated panel 2 has a back 9, visible in the view of FIG. 1 and a front, not visible in the view of FIG. 1, which is arranged on the opposite side of the back 9. The second elongated panel 4 has a back 10, visible in the view of FIG. 1 and a front, not visible in the view of FIG. 1, which is arranged on the opposite side of the back 10. The elongated end-panel 6 has a back 11 visible in the view of FIG. 1 and a front, not visible in the view of FIG. 1, which is arranged on the opposite side of the back 11.

The first elongated panel 2 has a front end 12 and a back end arranged opposite the front end 12 in the direction perpendicular to the longitudinal axis 3, the back end not being visible because the first elongated panel 2 overlaps the second elongated panel 4 such that the back end of the first elongated panel 2 is in front of the front of the second elongated panel 4 and the front end 13 of the second elongated panel 4 is behind the back 9 of the first elongated panel 2. The second elongated panel 4 has a front end 13 and a back end arranged opposite the front end 13 in the direction perpendicular to the longitudinal axis 5, the back end not being visible because the second elongated panel 4 overlaps the elongated end-panel 6 such that the back end of the second elongated panel 4 is in front of the front of the elongated end-panel 6 and the front end 14 of the elongated end-panel 6 is behind the back 10 of the second elongated panel 4. The elongated end-panel 6 has a front end 14 and a back end 15 arranged opposite the front end 14 in the direction perpendicular to the longitudinal axis 7.

As can be seen from FIG. 1, the first elongated panel 2, the second elongated panel 4 and the elongated end-panel 6 are identical in shape and built.

The first elongated panel 2, the second elongated panel 4 and the elongated end-panel 6 each have an element 16 attached to them, whereby a part of the element 16 attached to the first elongated panel 2 reaches behind the back 10 of the second elongated panel 4 and a part of the element 16 attached to the second elongated panel 4 reaches behind the back of the elongated end-panel 6. The element 6 that reaches behind the back of the neighboring panel is arranged at an angle relative to the longitudinal axis of the respective panels. The element 16 is used as a limiting device. The second elongated panel 4 has an abutment element 17 and the element 16 that is attached to the first elongated panel 2 and reaches behind the back of the second elongated panel 4 abuts against this abutment element 17 attached to the back of the second elongated panel 4 when the two panels 2, 4 reach a predetermined position relative to each other during the sheer movement (FIG. 3). For sheer movements in the opposite direction (FIG. 2) the elements 16 that reach behind the respective back of the respective neighboring panel are designed such that the elements 16 of two neighboring plates 2,4 abut against each other and thereby stop a further relative movement in the direction of the longitudinal axis.

The elements 16 that reach behind the back of the respective neighboring elongated panel are of hook shape, the free end of the hook being behind the back of the neighboring panel. This limits the movement of the neighboring panel in one direction perpendicular to the longitudinal axis 3, 5, 7, for example when the front end 13 of the second elongated panel 4 makes contact with the base of the hook-shaped element 16 attached to the first elongated panel 2.

Figure 8:
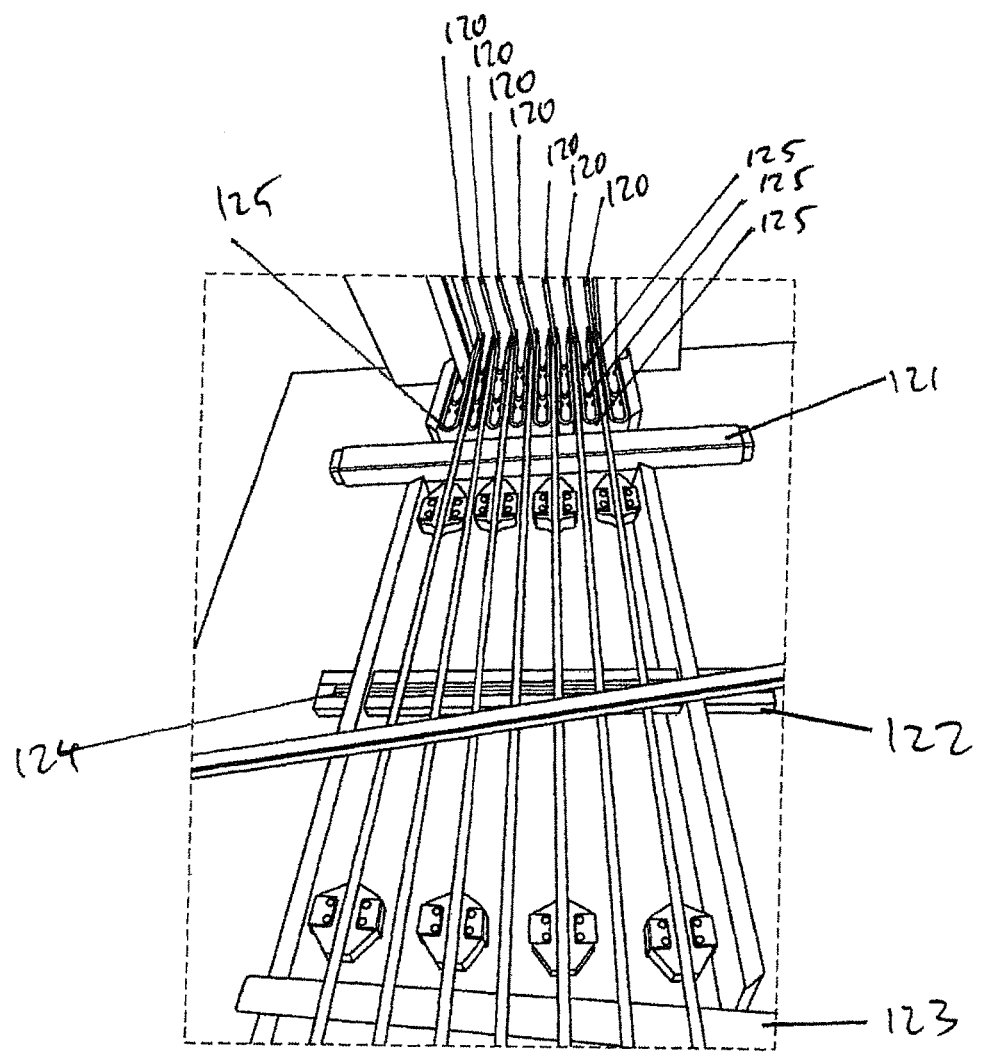
FIG. 8 shows a perspective view into the inside of a portion of a gangway according to the invention in an operational mode different to the first operational mode with the elongated panels of the sidewall and the floor having been removed for a better view onto the remaining parts.

The first elongated panel 2, the second elongated panel 4 and the elongated end-panel 6 have abutment elements 17. When built into a gangway according to the invention, the abutment elements 17 can be used to support the first elongated panel 2, the second elongated panel 4 and the elongated end-panel 6 on beams of hoops of the gangway (FIG. 8).

FIG. 1 shows the structure 1 in a first operational mode. This is the operational mode that the structure will take up, when built into a gangway according to the invention and the gangway is in the operational mode that the first car and the second car connected by the gangway are arranged in a straight line with the longitudinal axis of the cars being coaxial and the cars being on level ground.

Figure 2:
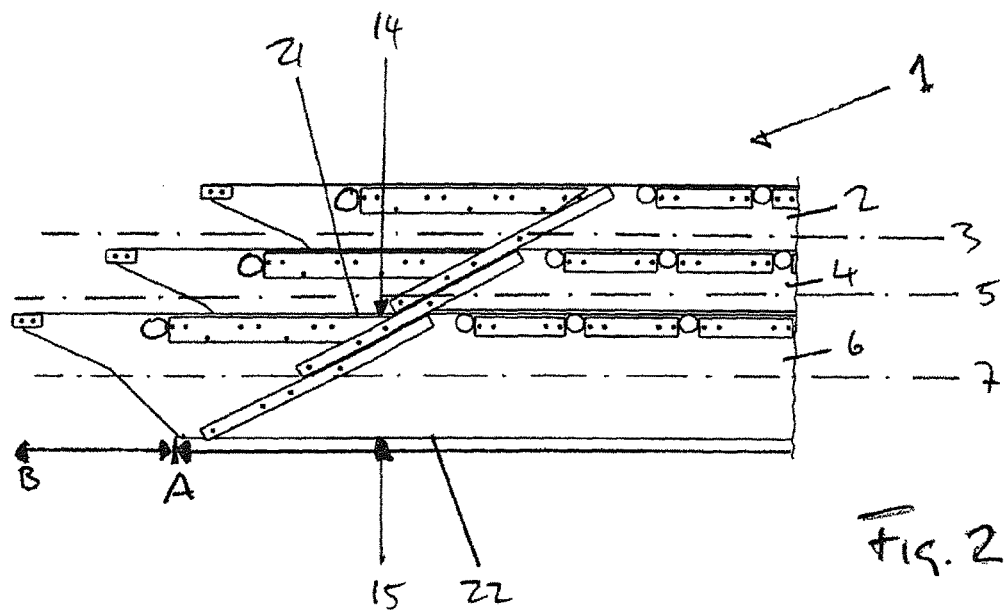
FIG. 2 shows a view from below onto a portion of the structure of FIG. 1 in a second operational mode.
Figure 3:
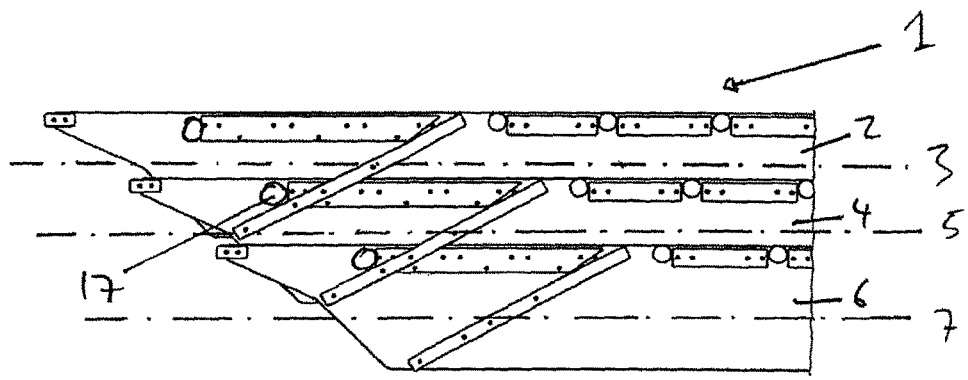
FIG. 3 shows a view from below onto a portion of the structure of FIG. 1 in a third operational mode.

FIG. 2 shows the structure 1 in a different operational mode. In this mode, the panels 2,4,6 have moved relative to each other along their respective longitudinal axis 3, 5, 7 in one direction (towards the right in FIG. 2). The longitudinal axis 3, 5, 7 are still parallel to each other. This is the operational mode that the structure 1 will take up, when built into a gangway according to the invention and the gangway is in the operational mode that the first car and the second car connected by the gangway are offset to each other with their longitudinal axis being parallel and in the same horizontal plane, but no coaxial. The movement from the first operational mode to the operational mode shown in FIG. 2 can be called a sheer movement. FIG. 3 shows a sheer movement in the opposite direction along the longitudinal axis 3, 5, 7 of the panels 2, 4, 6.

Figure 4:
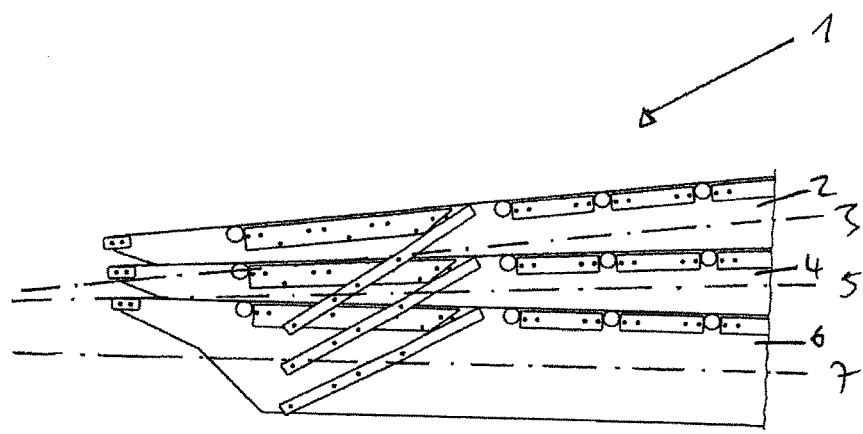
FIG. 4 shows a view from below onto a portion of the structure of FIG. 1 in a fourth operational mode.

By means of the arrow A FIG. 2 indicates the extend of central section 20 of the elongated end-panel 6 that is substantially rectangular. The substantially rectangular central section 20 has a first elongated side 21 that forms part of the front end 14 of the respective panel and has a second elongated side 22, parallel to the first side 21 that forms part of the back end 15 of the respective panel. By means of the arrow B FIG. 2 indicates the extend of a side end section of the elongated end panel 6 that extends along the respective longitudinal axis of the respective panel, whereby the width of the side end section in direction perpendicular to the respective longitudinal axis diminishes in the direction along the respective longitudinal axis. As can be seen in FIG. 4 this allows this end of the panel and the neighboring ends of the neighboring panels to be moved closer to each other without the side ends of the respective panels abutting against each other or disturbing the respective movement of the panel. The side end section has a front end that is in line with the front end 14 as it is defined by the first elongated side 21 of a central section that forms part of the panel. The width of the side end section thus diminishes by way of moving the back end closer towards the front end. The back end of the side end section is arranged at a steeper angle relative to the longitudinal axis for a part of the side end section that is closer to the central section. For a part of the side end section that is further away from the central section, the back end of the side end section is arranged at an angle shallower than the steeper angle relative to the longitudinal axis.

Figure 5:
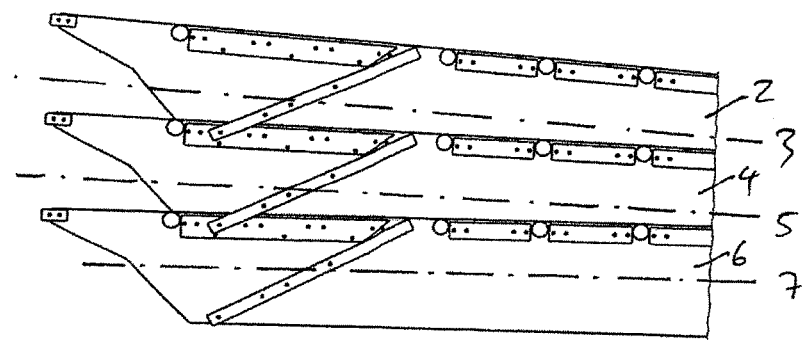
FIG. 5 shows a view from below onto a portion of the structure of FIG. 1 in a fifth operational mode.

FIG. 4 shows the structure 1 in a different operational mode, in this mode, the panels 2,4,6 have moved relative to each other along in a swivel movement (spread out, fanned out). The longitudinal axis 3, 5, 7 are not parallel to each other anymore. This is the operational mode that the structure 1 will take up, when built into a gangway according to the invention and the gangway is in the operational mode that the first car and the second car connected by the gangway are travelling around a bend. In the FIG. 4, the left hand side of the structure 1 will be at the side of the gangway that is on the inner side of the bend. In the FIG. 5, the left hand side of the structure 1 will be at the side of the gangway that is on the outer side of the bend.

Figure 6:
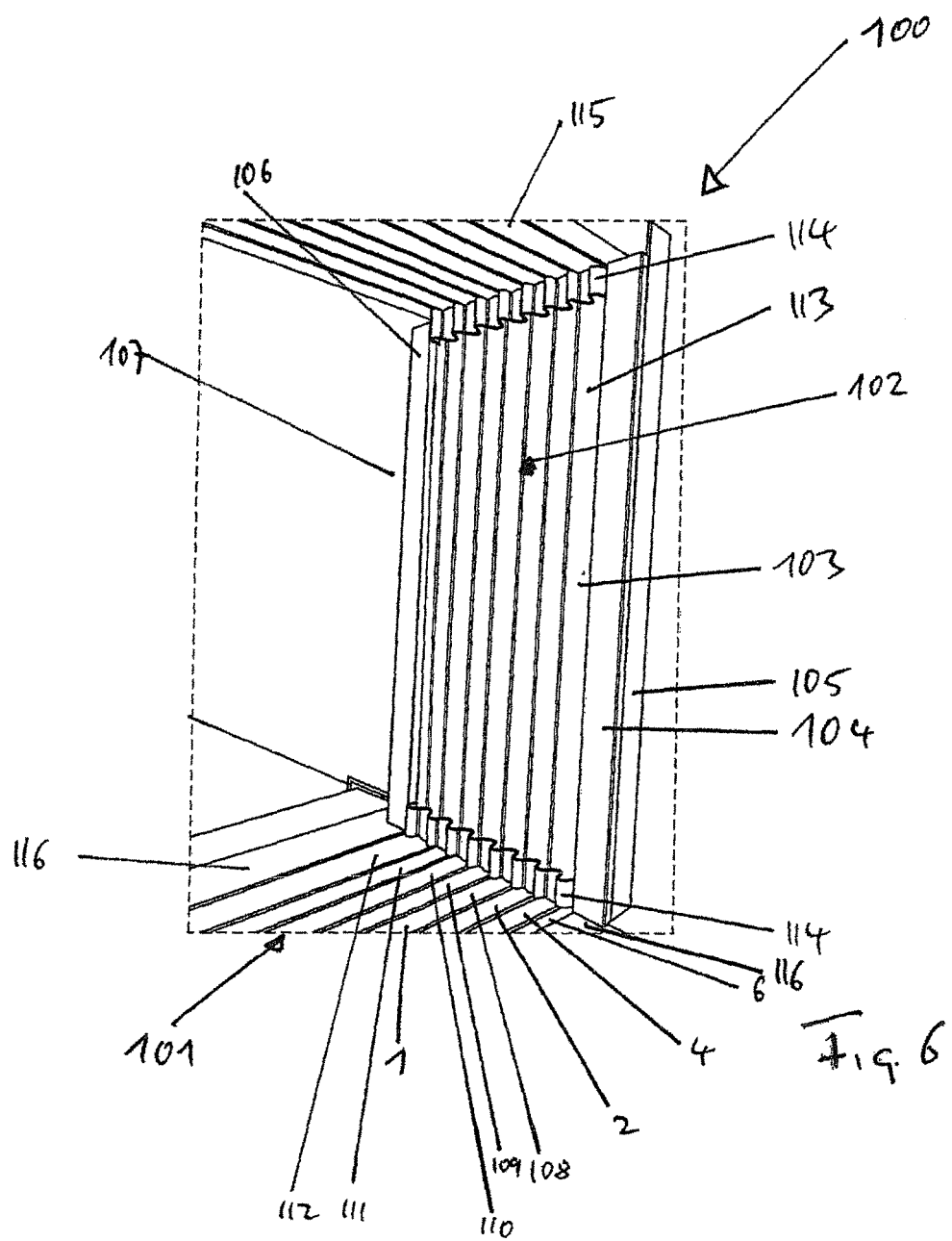
FIG. 6 shows a perspective view into the inside of a portion of a gangway according to the invention in a first operational mode.

FIG. 6 shows a perspective view into the inside of a portion of a gangway 100 according to the invention in a first operational mode. A first structure 1 according to the invention forms part of the floor 101 of the gangway. A second structure 102 according to the invention forms part of the sidewall 103 of the gangway. The gangway 100 has a first end frame 104 that is connected to a first car 105. At the opposite end of the gangway 100, a second end frame 106 is arranged that is connected to a second car 107. FIG. 6 shows the gangway 100 in the first operational mode that it will take up, when the first car 105 and the second car 107 connected by the gangway 100 are arranged in a straight line with the longitudinal axis of the cars being coaxial and the cars being on level ground as shown in FIG. 6.

FIG. 6 shows that the invention is preferably realized with the structure 1 having more elongated panels than the first elongated panel 2, the second elongated panel 4 and the elongated end-panel 6. As shown in FIG. 6, the structure 1 has five more elongated panels, namely a third elongated panel 108, a fourth elongated panel 109, a fifth elongated panel 110, a sixth elongated panel 111 and a sevenths elongated panel 112. The further five elongated panels 108 to 112 are identical in structure and built to the panels 2, 4, 6 are arranged in the same overlapping manner as described with reference to the panels 2, 4, 6 in FIG. 1.

FIG. 6 shows that the structure 102 according to the invention that forms part of the sidewall 103 has differently structured and built elongated panels 113, when compared to the panels 2, 4, 6, 108 to 112. However, with regard to their overlapping, the elongated panels 113 are arranged in the same manner as the panels 2, 4, 6, 108 to 112 and thus according to the invention (see also description of FIG. 9).

FIG. 6 shows that at the bottom and the top of the sidewall 103, protective rubber elements 114 are provided. These are elongated elements that grip around the bottom end and the top end respectively of the elongated panels 113. The protective rubber elements 114 close the gap between the bottom end and the top end respectively of the elongated panels 113 and the to surface of the floor 101 and the lower surface of the ceiling 115 respectively. The elongated elements can also be made by way of providing each elongated panel with a central rubber boot protruding from the panel surface across the portion of the panel that is never obscured by the adjacent panel even under the worst movement case. This central boot can be flanked on either side by a compressible tubular or similar section that will abut a similar feature on the adjacent panels, thus creating an overhanging rubber edge that can accommodate all movement cases without creating a gap for passenger feet or other objects.

FIG. 6 shows a train designs are known, where a tread plate 116 is attached to the car 105 and where a tread plate 116 is attached to the car 107, the tread plates 116 resting on the floor of the gangway. The tread plate 116 attached to the car 107 rests on the end-panel 6.

FIG. 6 shows that the fronts of the elongated panels are facing inwards, the inside of the gangway being the free volume through which the passenger is intended to move from one car to the next car.

Figure 7:
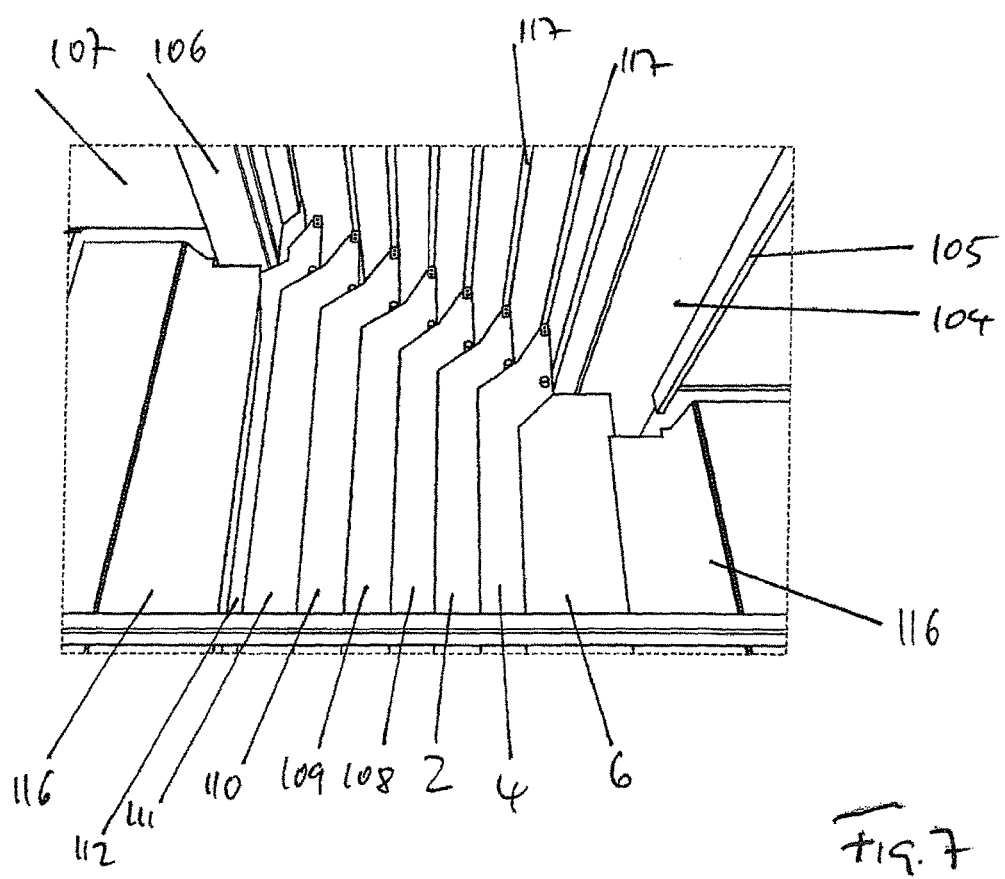
FIG. 7 shows a perspective view into the inside of a portion of a gangway according to the invention in a second operational mode with the elongated panels of the sidewall having been removed for a better view onto the remaining parts.

FIG. 7 shows a perspective view into the inside of a portion of a gangway according to the invention in a second operational mode with the elongated panels of the sidewall having been removed for a better view onto the remaining parts. The front end of the first elongated is supported by a first beam, the front end of the second elongated is supported by a second beam and the front end of the longitudinal end-panel is supported by an end beam, the first, second and end beam being arranged below the panels in the view of FIG. 7. The abutment elements 17 are arranged between the front end of the panel and the beam such that the basic body rests on the beam via the abutment elements. The beams are arranged to be movable relative to each other.

The first elongated is arranged in such a manner that it can swivel about an axis that is parallel to the first longitudinal axis. The second elongated is arranged in such a manner that it can swivel about an axis that is parallel to the second longitudinal axis. The first elongated panel 2 and the second elongated panel 4 each are connected in a pivotable manner to a vertically extending beam 117 at their respective side ends.

FIG. 8 shows a perspective view into the inside of a portion of a gangway according to the invention in an operational mode different to the first operational mode with the elongated panels of the sidewall and the floor having been removed for a better view onto the remaining parts. FIG. 8 shows that the gangway 100 has a series of hoops 120. The hoops have an essentially rectangular shape. FIG. 8 shows the lower beam and the one vertical beam of the rectangular hoop, the top beam and the second vertical beam not being visible in the view shown in FIG. 8. The hoops are made up of joint together beams. The horizontal beams on which the elongated panels of the floor are supported by the abutment member 17 form the lower, horizontal beams of the hoops.

Elastic elements 125 made of bend elastic bands are arranged between the beams in a horse shoe-shape, the elongated linear parts of the horse shoe being attached to the respective beam. Three of such horse shoe shaped elastic elements are arranged between respective beams per side of the gangway. The beams 120 each have a three holes.

Further beams 121, 122, 123 pass through the respective hole in each respective beam. The beam 122 is arranged approximately in the middle of the panels, while further two beams 121, 123 are arranged towards the side end sections of the respective beams. The beam 122 has guiding rails 124 with guiding elements being attached to the respective panel and resting in the guiding rail.

Element 125 are arranged protruding a first distance from the beams such as to prevent the neighboring beam to come closer to the respective beam as the first distance. The element 125 has a tapered shape. The element 125 has an elastic coating.

Figure 9:
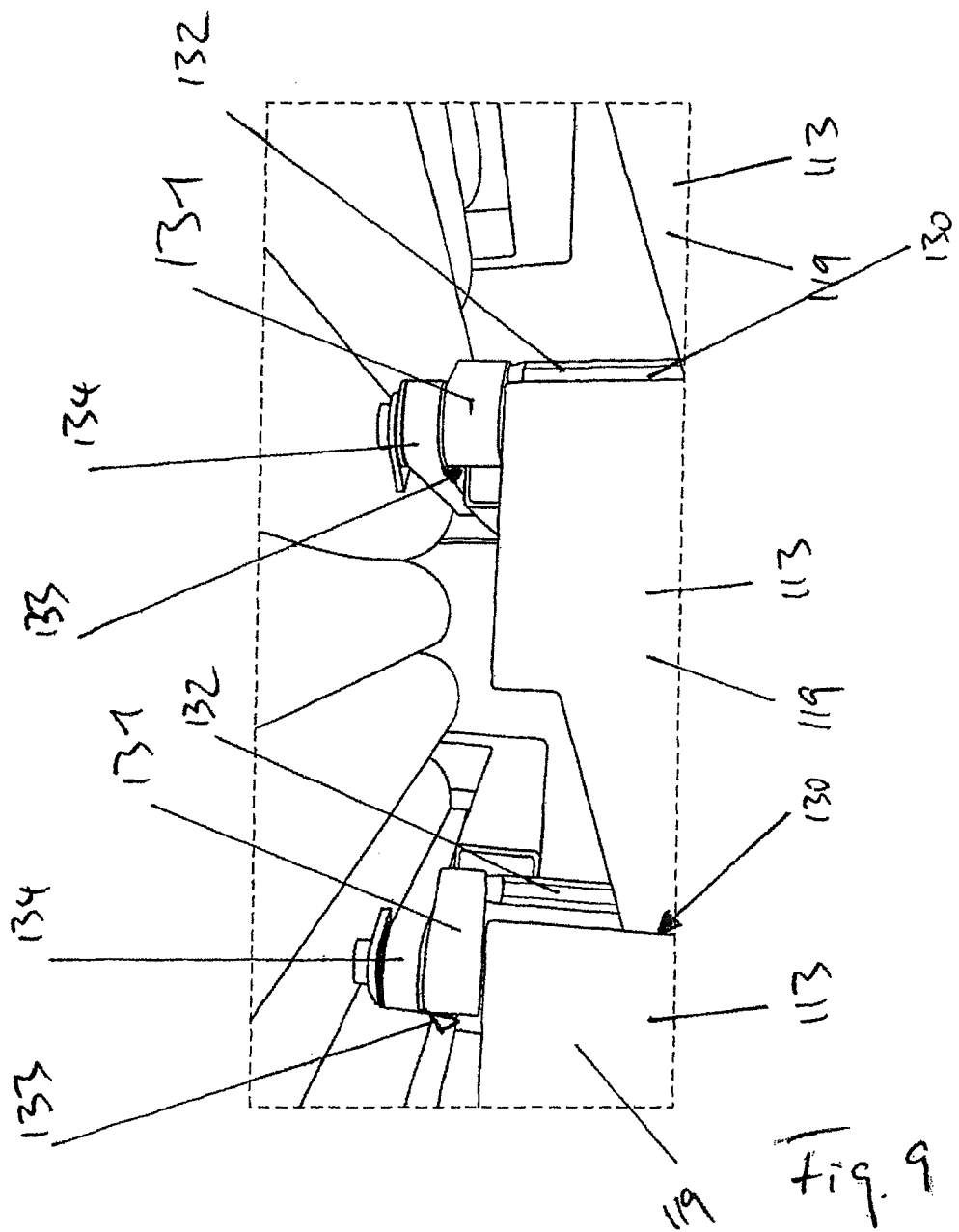
FIG. 9 shows a perspective view of the second side end sections of elongated panels of a structure according to the invention being used to from part of a sidewall of a gangway, the second side end sections being held by holding elements

FIG. 9 shows a perspective view of the second side end sections of elongated panels of a structure according to the invention being used to from part of a sidewall of a gangway, the second side end sections being held by holding elements. As can be seen from FIG. 9 the first elongated panels 113 have a front 119 and a back, not visible in the view of FIG. 9, which is arranged on the opposite side of the front 119. The elongated panels 113 have a front end 130 and a back end arranged opposite the front end 130 in the direction perpendicular to the longitudinal axis of the respective panel 113, the back end not being visible because the neighboring elongated panel 113 overlaps the respective elongated panel 113 such that the back end of the respective elongated panel 113 is behind the back of the neighboring elongated panel 113 and the front end 130 of the neighboring elongated panel 113 is in front of the front 119 of the respective elongated panel 113.

An element 131 attached to the elongated panel 113 has a portion 132 that reaches behind the back of the neighboring elongated panel and extends parallel to the longitudinal axis of the respective panel. The portion 132 extends parallel to the longitudinal axis and parallel to the front end 130 of the respective panel. The neighboring panel 113 is slit between the elongated panel 113 and the portion 132 such that the element reaches behind the back of the neighboring elongated panel 113.

The elongated 113 has a first side end (not shown) that forms the one end of the elongated 113 in the direction of the longitudinal axis. The first side end is supported by a support element (not shown). A second side end 133 that forms the end opposite the first side end of the elongated 113 in the direction of the longitudinal axis is held by a holding element 134. The respective second sides 133 of neighboring elongated panels 113 are held by different holding elements 134.

FIG. 10 shows a further alternative or additional aspect of a gangway according to the invention in a sectional view that shows a section of the bellows of a gangway. FIG. 10 shows horizontally orientated beams 200. These beams form the top beams of the hoops of which FIG. 8 shows the lower beam and the one vertical beam of the rectangular hoop. The arrow C indicates in inward facing direction (the inside of the gangway being the free volume through which the passenger is intended to move from one car to the next car). FIG. 10 also shows an inner bellows 201 of the gangway that is attached to the horizontal beams by means of screws 202. The inward facing bellows 201 is made up of a series of convolutes 203. The convolutes 203 are made from rubber-material. The convolutes 203 approximately have the cross-sectional shape of a horse-shoe. A first convolute 203 is connected to a second neighboring convolute 203 by means of attaching the one elongated section 204 of the first horse-shoe shaped convolute 203 to one elongated section 205 of the second horse-show shaped convolute 203. The connection is formed by protruding elements 206 that are connected to the one elongated section 204 of the first horse-shoe shaped convolute 203 and a channel 207 connected to one elongated section 205 of the second horse-show shaped convolute 203. The protruding element 206 is held inside the channel 207 in such a manner that the protruding element 206 can slide along the channel 207, thereby allowing the one elongated section 204 of the first horse-shoe shaped convolute 203 to slide relative to the one elongated section 205 of the second horse-show shaped convolute 203.

The other elongated section 208 of the second horse-show shaped convolute 203 is fixedly connected to one elongated section 209 of a third horse-show shaped convolute 203 in that the other elongated section 208 and one elongated section 209 are sewn together.

The invention claimed is:

1. A gangway for connecting a first car with a second car and for allowing passage of passengers from the first car to the second car, comprising:
   a first hoop having a straight line section for at least a portion of its circumference;
   a second hoop;
   bellows made up of a series of convolutes, a majority of the convolutes approximately having the cross-sectional shape of a horse-shoe; and
   a connection element connected to the first hoop and to the second hoop via a first one of the horse-shoe shaped convolutes of the bellows and a second neighbouring one of the horse-shoe shaped convolutes of the bellows, the connection element including an elongated free surface slideably movable relative to the straight line section of the first hoop,
   wherein the first one of the horse-shoe shaped convolutes is connected to the second neighbouring one of the horse-shoe shaped convolutes by attaching one elongated section of the first one of the horse-shoe shaped convolutes to one elongated section of the second one of the horse-shoe shaped convolutes, wherein the connection element allows the one elongated section of the first one of the horse-shoe shaped convolutes to slide relative to the one elongated section of the second one of the horse-shoe shaped convolutes.

2. The gangway of claim 1, wherein the elongated free surface is slideably movable in a linear motion relative to the straight line section.

3. The gangway of claim 1, wherein the one elongated section of the first one of the horse-shoe shaped convolutes faces the one elongated section of the second one of the horse-shoe shaped convolutes.

4. The gangway of claim 1, further comprising a plurality of hoops, and wherein:
   each hoop has a straight line section,
   a connection element is provided between each of two neighbouring hoops and connected to the first one of the horse-shoe shaped convolutes and the second one of the horse-shoe shaped convolutes,
   each connection element has an elongated free surface, and
   the elongated free surface of the connection element is slideably movable relative to the straight line section.

5. The gangway of claim 1, wherein the connection element is formed by protruding elements that are connected to the one elongated section of the first one of the horse-shoe shaped convolutes and a channel connected to the one elongated section of the second one of the horse-shoe shaped convolutes, wherein the protruding elements are held inside the channel in such a manner that the protruding elements can slide along the channel allowing the one elongated section of the first one of the horse-shoe shaped convolutes to slide relative to the one elongated section of the second one of the horse-shoe shaped convolutes.

6. The gangway of claim 1, wherein another elongated section of the second one of the horse-shoe shaped convolutes is fixedly connected to one elongated section of a third one of the horse-shoe shaped convolutes.

7. A gangway for connecting a first car with a second car and for allowing passage of passengers from the first car to the second car, comprising:
- a first hoop having a straight line section for at least a portion of its circumference;
- a second hoop;
- bellows made up of a series of convolutes, a majority of the convolutes approximately having the cross-sectional shape of a horse-shoe; and
- a connection element connected to the first hoop and to the second hoop via a first one of the horse-shoe shaped convolutes of the bellows and a second neighbouring one of the horse-shoe shaped convolutes of the bellows, and configured to permit the first one of the horse-shoe shaped convolutes to slide relative to the second one of the horse-shoe shaped convolutes, the connection element being connected to the first one of the horse-shoe shaped convolutes by means of protruding elements arranged as part of the connection element slideably engaging with rails arranged as part of the first one of the horse-shoe shaped convolute or by means of protruding elements arranged as part of the first one of the horse-shoe shaped convolutes slideably engaging with rails arranged as part of the connection element.

8. The gangway of claim 7, further comprising a plurality of hoops, wherein:
- each hoop has a straight line section, and
- a connection element is provided between each of two neighbouring hoops and connected to the first one of the horse-shoe shaped convolutes by means of protruding elements arranged as part of the connection element slideably engaging with rails arranged as part of the first one of the horse-shoe shaped convolutes or by means of protruding elements arranged as part of the first one of the horse-shoe shaped convolutes slideably engaging with rails arranged as part of the connection element.

9. The gangway of claim 7, wherein another elongated section of the second one of the horse-shoe shaped convolutes is fixedly connected to one elongated section of a third one of the horse-shoe shaped convolutes.

10. A gangway for connecting a first car with a second car and for allowing passage of passengers from the first car to the second car, comprising:
- bellows made up of a series of convolutes, the majority of convolutes approximately having the cross-sectional shape of a horse-shoe,
- wherein a first horse-shoe shaped convolute is connected to a second neighbouring horse-shoe shaped convolute by means of attaching one elongated section of the first horse-shoe shaped convolute to one elongated section of the second horse-shoe shaped convolute, wherein the connection allows the one elongated section of the first horse-shoe shaped convolute to slide relative to the one elongated section of the second horse-shoe shaped convolute.

11. The gangway of claim 10, wherein the connection is formed by protruding elements that are connected to the one elongated section of the first horse-shoe shaped convolute and a channel connected to one elongated section of the second horse-shoe shaped convolute, wherein the protruding elements are held inside the channel in such a manner that the protruding elements can slide along the channel allowing the one elongated section of the first horse-shoe shaped convolute to slide relative to the one elongated section of the second horse-shoe shaped convolute.

12. The gangway of claim 10, wherein another elongated section of the second horse-shoe shaped convolute is fixedly connected to one elongated section of a third horse-shoe shaped convolute.

* * * * *